(12) United States Patent
Wigginton et al.

(10) Patent No.: US 8,694,381 B1
(45) Date of Patent: Apr. 8, 2014

(54) PERSONAL COMPUTER LIFECYCLE MANAGEMENT / PERSONAL COMPUTER VALIDATION TOOL

(75) Inventors: Richard T. Wigginton, Bloomfield Hills, MI (US); Andrew L. Nolan, Ann Arbor, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4431 days.

(21) Appl. No.: 10/305,419

(22) Filed: Nov. 27, 2002

(51) Int. Cl.
*G06G 1/14* (2006.01)
*G06F 7/00* (2006.01)

(52) U.S. Cl.
USPC .................................................. 705/22; 707/1

(58) Field of Classification Search
USPC ..................................................... 705/22, 28
See application file for complete search history.

(56) References Cited

U.S. PATENT DOCUMENTS

| | | | | |
|---|---|---|---|---|
| 5,774,876 A | * | 6/1998 | Woolley et al. | 705/28 |
| 7,231,356 B1 | * | 6/2007 | Ward et al. | 705/7.26 |
| 2002/0065798 A1 | * | 5/2002 | Bostleman et al. | 707/1 |
| 2002/0133250 A1 | * | 9/2002 | Kopcha | 700/95 |
| 2002/0143937 A1 | * | 10/2002 | Revashetti et al. | 709/224 |
| 2002/0193898 A1 | * | 12/2002 | Kimball et al. | 700/108 |
| 2003/0079132 A1 | * | 4/2003 | Bryant | 713/182 |
| 2003/0233287 A1 | * | 12/2003 | Sadler et al. | 705/28 |
| 2004/0186794 A1 | * | 9/2004 | Renz et al. | 705/28 |

* cited by examiner

*Primary Examiner* — Garcia Ade

(57) ABSTRACT

A PC lifecycle management (PCLCM) program assists an organization or set of organizations in the tracking and managing a PC inventory. At least one PC in the inventory is assigned to a primary user. The responsibilities regarding PC inventory tracking and maintenance are decentralized such that the primary user is responsible for tracking and maintaining accurate information regarding the PC assigned to the primary user. To support the decentralization, a computer-based tool is provided. The tool includes a database of information related to the PC inventory. The database has one or more records containing information regarding the PC assigned to the primary user. The tool also includes a PC validation component. The PC validation component includes processes and interfaces for accessing the database such that the primary user can view and update information in the database regarding the PC assigned to the primary user.

21 Claims, 18 Drawing Sheets

| Role | Description and Responsibilities |
|---|---|
| Individual User | PCs in the inventory are assigned to a primary user. The primary user is responsible for maintaining his/her personal inventory using the PCLCM validation tool, knowing the location of each PC in his/her personal inventory, and marking every change in PC status in the PCLCM tool. |
| Organization Coordinator | Assigned by management of each group using the PCLCM tool. Responsible for communicating PCLCM, inventory and PC policies and information to the users and management of their group. Assure compliance with inventory policies and procedures. Coordinates PC replacement orders and lease end returns. User contact for any PC problems. Report inventory and PC policy compliance to group management. |
| Leadership | Set overall policies for PCs and PC inventory. Set PC inventory policies for organization. Work with PCLCM manager, other management, coordinator and users to assure policy compliance. Direct and support compliance with PCLCM processes. |

| Role | | Description and Responsibilities |
|---|---|---|
| Central Support Group | PCLCM Leader | Manages the creation and implementation of PCLCM tools, processes and procedures. Reports PCLCM status to leadership. Implements leadership's PC inventory policies and directives. Assures effective communication between users, coordinators, PCLCM team and leadership. |
| | PCLCM Order Coordinator | Facilitates the PC replacement process. Works with coordinator to assure PCs are replaced on an appropriate schedule. Works with Order Processing group to assure orders are placed and inventory is maintained. Works with financial manager to expedite purchase approvals. |
| | PCLCM Order Processing | This group generates the requisition to order replacement PCs and enters the new order information into the PCLCM database. |
| | PCLCM Financial Leader | The manager with financial responsibility for the PCs. |
| | PCLCM Asset Management | Synchronize PCLCM database with corporate data sources. Assist users and coordinators in retirement and termination of PC assets. Track and communicate PC inventory problems to users, coordinators and leadership. Research problems with PCLCM database and corporate data sources. |

| Role | Description and Responsibilities |
|---|---|
| Individual User | PCs in the inventory are assigned to a primary user. The primary user is responsible for maintaining his/her personal inventory using the PCLCM validation tool, knowing the location of each PC in his/her personal inventory, and marking every change in PC status in the PCLCM tool. |
| Organization Coordinator | Assigned by management of each group using the PCLCM tool. Responsible for communicating PCLCM, inventory and PC policies and information to the users and management of their group. Assure compliance with inventory policies and procedures. Coordinates PC replacement orders and lease end returns. User contact for any PC problems. Report inventory and PC policy compliance to group management. |
| Leadership | Set overall policies for PCs and PC inventory. Set PC inventory policies for organization. Work with PCLCM manager, other management, coordinator and users to assure policy compliance. Direct and support compliance with PCLCM processes. |

Figure 1A

| | Role | Description and Responsibilities |
|---|---|---|
| Central Support Group | PCLCM Leader | Manages the creation and implementation of PCLCM tools, processes and procedures. Reports PCLCM status to leadership. Implements leadership's PC inventory policies and directives. Assures effective communication between users, coordinators, PCLCM team and leadership. |
| | PCLCM Order Coordinator | Facilitates the PC replacement process. Works with coordinator to assure PCs are replaced on an appropriate schedule. Works with Order Processing group to assure orders are placed and inventory is maintained. Works with financial manager to expedite purchase approvals. |
| | PCLCM Order Processing | This group generates the requisition to order replacement PCs and enters the new order information into the PCLCM database. |
| | PCLCM Financial Leader | The manager with financial responsibility for the PCs. |
| | PCLCM Asset Management | Synchronize PCLCM database with corporate data sources. Assist users and coordinators in retirement and termination of PC assets. Track and communicate PC inventory problems to users, coordinators and leadership. Research problems with PCLCM database and corporate data sources. |

EDS Inventory:
Create Status 10 Records - Confirm

INSTRUCTIONS:
If the information below is correct click on the "Create Status 10 Record" button and a Status 10, "Ordered" status record will be created. (Modified for Dell Orders)

630 — New desktop PC Order For JANET C SCHULTZ, EDS Net ID: CZ8MPR

Requisition Number: 987654     Date: 10/4/2002     Asset Owner: 5002404039 (EDS/GM and EIT/GM)

620:

| Replacement Type | EDS Part Number | DELL Part Number | Description |
|---|---|---|---|
| New Dell Desktop | 203-99730 | 220-9760 | Optiplex GX260T |

REPLACING PC IN EDS INVENTORY RECORDID: 10864

625:

| Type | Manufacturer | Model Number | Description | Serial number |
|---|---|---|---|---|
| Standard Laptop | IBM | 2645 | AAP MODEL BBE 300MHZ | 78XW063 |

650 — Create Status 10 Record

622 — Return to Menu

621 — Return to Status 10 Start

*Send question and comments to:* Andy Nolan Phone (248) 265-7130 (8-365)

Content Last Modified October 1, 2002 rbw

You are done with the validation process when the status of every PC on the list has a status of "Valid" or otherwise has the correct status. If a serial number is not underlined than that PC has a special status that may only be changed by the system. These PCs with special status are considered "valid". Use the "There is no equipment assigned to this employee" button only if this person has no EDS PCs assigned (The customer supplies their PC, for example.)

EDS Inventory finds the following PCs assigned to CZ8MPR, JANET SCHULTZ.

You must click on each the underlined serial number to validate or delete these records

705 {

| Serial Number | Status | Manufacturer | Physical Asset Tag | Machine Type | Lease End Date | Lease/ Fixed Asset |
|---|---|---|---|---|---|---|
| 78XP633 | Valid | IBM | J01302928 | Old-St'd Laptop | | Unknown |
| 78XW063 | Valid | IBM | J00817542 | Old-St'd Laptop | 2/28/2002 | Lease - PO LS90000845 Contract 00011382-009617 |
| 7907CB640076 | Valid | COMPAQ | J01289364 | Old-St'd Laptop | | Fixed Asset - Service Date 9905 |
| DELLX | Valid | DELL | Unknown | New-St'd Desktop | 12/31/2005 | Lease - Pending |
| Replaces-T1008 | Ordered | IBM | Unknown | Old-St'd Desktop | | Lease - Pending |
| T1006 | Valid | DELL | phytag | Other | 3/13/2002 | assetxxxx |

Figure 7C

PC Verification Database Summary

Organizations based on SAP Extract from September 25, 2002 applied 9/25/2002 10:33:00 AM
GM Account & EIT GM Only (sorted by valid PCs per employee ratio employees)

| Organization | Leader | Empls | Valid PCs | Valid/Empl (ratio) | Returned | Excess | Desktop (percent) | Devel (percent) | Laptop (percent) | Other (percent) | No PC | Released Stolen Lost | Unverified |
|---|---|---|---|---|---|---|---|---|---|---|---|---|---|
| EIT / GM | Dixon | 55 | 84 | 1.53 | 12 | 0 | 9.5 | 33.3 | 57.1 | 0.0 | 0 | 1 | 0 |
| EDS/GM Global Client Delivery | Fennel | 2964 | 3625 | 1.22 | 522 | 84 | 52.8 | 2.8 | 41.4 | 2.5 | 229 | 59 | 0 |
| Hoover-Staff | Hoover | 14 | 17 | 1.21 | 0 | 0 | 5.9 | 5.9 | 88.2 | 0.0 | 1 | 0 | 0 |
| GM North America | Stolkey | 167 | 190 | 1.14 | 58 | 0 | 14.2 | 3.2 | 82.6 | 0.0 | 0 | 7 | 0 |
| Global Programme Delivery | Adler | 1913 | 2108 | 1.10 | 480 | 43 | 40.0 | 10.1 | 49.5 | 0.2 | 29 | 24 | 0 |
| GMAC NA Operations and Finance | Koch | 9 | 9 | 1.00 | 4 | 0 | 22.2 | 0.0 | 77.8 | 0.0 | 0 | 0 | 0 |
| Customer Interface/Develop Product | Krauss | 8 | 8 | 1.00 | 2 | 0 | 0.0 | 0.0 | 100.0 | 0.0 | 0 | 0 | 0 |
| Global Marketing and Sales | Mitchell | 7 | 7 | 1.00 | 1 | 0 | 14.3 | 0.0 | 85.7 | 0.0 | 0 | 0 | 0 |
| Business Venture and Control | Friedman | 4 | 4 | 1.00 | 0 | 0 | 0.0 | 0.0 | 100.0 | 0.0 | 0 | 0 | 0 |
| Customer Interface/Produce Product | Dodge | 7 | 6 | 0.86 | 0 | 0 | 16.7 | 0.0 | 83.3 | 0.0 | 1 | 0 | 0 |
| LAAMO | Durrer | 3 | 1 | 0.33 | 0 | 0 | 100.0 | 0.0 | 0.0 | 0.0 | 0 | 0 | 0 |
| Totals | | 5151 | 6059 | 1.18 | 1079 | 127 | 46.2 | 5.8 | 46.1 | 1.6 | 260 | 91 | 0 |

Figure 8

PERSONAL COMPUTER LIFECYCLE MANAGEMENT / PERSONAL COMPUTER VALIDATION TOOL

TECHNICAL FIELD

This description relates to a PC lifecycle management system.

BACKGROUND

Traditional general inventory management systems and PC inventory management systems are designed for and rely on a centralized group of people who are solely responsible for inventory accuracy. That is, a central asset management group has sole responsibility and accountability for tracking equipment and maintaining an accurate inventory.

SUMMARY

In one general aspect, a PC lifecycle management (PCLCM) program assists an organization or set of organizations in the tracking and managing of a PC inventory. At least one PC in the inventory is assigned to a primary user. The responsibilities regarding PC inventory tracking and maintenance are decentralized such that the primary user is responsible for tracking and maintaining accurate information regarding the PC assigned to the primary user. To support the decentralization, a computer-based tool is provided. The tool includes a database of information related to the PC inventory. The database has one or more records containing information regarding the PC assigned to the primary user. The tool also includes a PC validation component. The PC validation component includes processes and interfaces for accessing the database such that the primary user can view and update information in the database regarding the PC assigned to the primary user.

Implementations may include one or more of the following features. For example, a procurement planning component and a procurement processing component may be integrated into the tool. The procurement planning component may include the processes and interfaces that enable flagging of PCs in the PC inventory for replacement with new PCs and designating a replacement PC type for the new PCs. The procurement processing component may include processes and interfaces that facilitate creation of new records in the database for newly ordered PCs.

An inventory query and update component and a standard report component may be integrated into the tool. The inventory query and update component may include processes and interfaces that allow querying and updating of the information related to the PC inventory contained in the database. The standard report component may include processes and interfaces for the generation of standard reports using preset queries of the database.

The primary user may be required to periodically use the tool to verify that the information in the database regarding the PC assigned to the primary user is accurate. Leaders, management or a central support group may be permitted to use the inventory query and update component to generate ad-hoc reports based on the information related to the PC inventory, make updates to the information related to the PC inventory, and determine whether the primary user has verified that the information in the database regarding the PC assigned to the primary user is accurate. Leaders or management may be permitted to use the procurement planning component to flag the PC assigned to the primary user for replacement with a new PC and to designate a replacement PC type for the new PC. A central support group may be permitted to use the procurement processing component to generate a new record in the database for the new PC. Leaders and management may be permitted to use the standard report component to generate standard reports based on the information related to the PC inventory.

The information regarding the PC assigned to the primary user may include any of the following: assigned user, type of PC, serial number, order number, whether the PC is a fixed asset or leased, lease-end information, asset owner information, depreciation, discontinuance order number, status and lifecycle status history.

In the described PCLCM program, the primary users of the equipment are mobilized and equipped to track their own inventory. As a result, the frequency and speed with which the inventory can be updated and monitored is increased. A virtual physical inventory can be accomplished by requiring each user to update information for equipment assigned to them. The data can be kept up-to-date by requiring periodic verification and immediate reporting of changes in status.

With such a program, immediate inventory feedback and accountability may be provided on an on-going basis. Consequently, discrepancies in the inventory are more readily apparent and can be followed up on immediately. The resulting quick turnaround time makes it possible to fix a problem before the problem becomes untraceable.

Other inventory accuracy problems may be bypassed. For instance, problems with automatic PC inventory polling scans may be avoided. Those problems include, for example, incorrect selection of the primary user when the scan returns multiple users. Automatic polling scans also fail to detect PCs that are not connected to the network.

Such a program also may alleviate many of the difficulties that occur with a purely centralized approach to inventory management. As the nature of companies change, several business factors, such as constant change (especially with the proliferation of notebook computers), growing geographical distribution of employees, and alternate work arrangements, makes a purely centralized approach to inventory management problematic in some areas such as inventory accuracy and procurement.

Moreover, such a program may help to protect financial investments. For example, improved knowledge and accountability for asset assignments may decrease the costs of lease buyouts and penalties. Lease end dates may be easily monitored and fed into the replacement process to ensure timely return of equipment with an expiring lease. Leadership's ability to manage the inventory may increase due to the information and speed with which decisions can be made and implemented based on real-time availability of data.

The details of one or more implementations are set forth in the accompanying drawings and the description below. Other features will be apparent from the description and drawings, and from the claims.

DESCRIPTION OF DRAWINGS

FIGS. 1A and 1B together provide a responsibility chart that illustrates one manner of dividing the roles and responsibilities in the PCLCM program.

FIGS. 5A-5E show a procurement planning interface.

FIGS. 6A-6D show a interface for building and confirming a skeleton record.

FIGS. 7A-7C illustrate an interface for features of the PC validation component of the tool.

FIG. 8 shows a screen displaying a report that can be generated using the query and update component or included as a standard report of the report component.

Like reference symbols in the various drawings indicate like elements.

DETAILED DESCRIPTION

Figure 2:
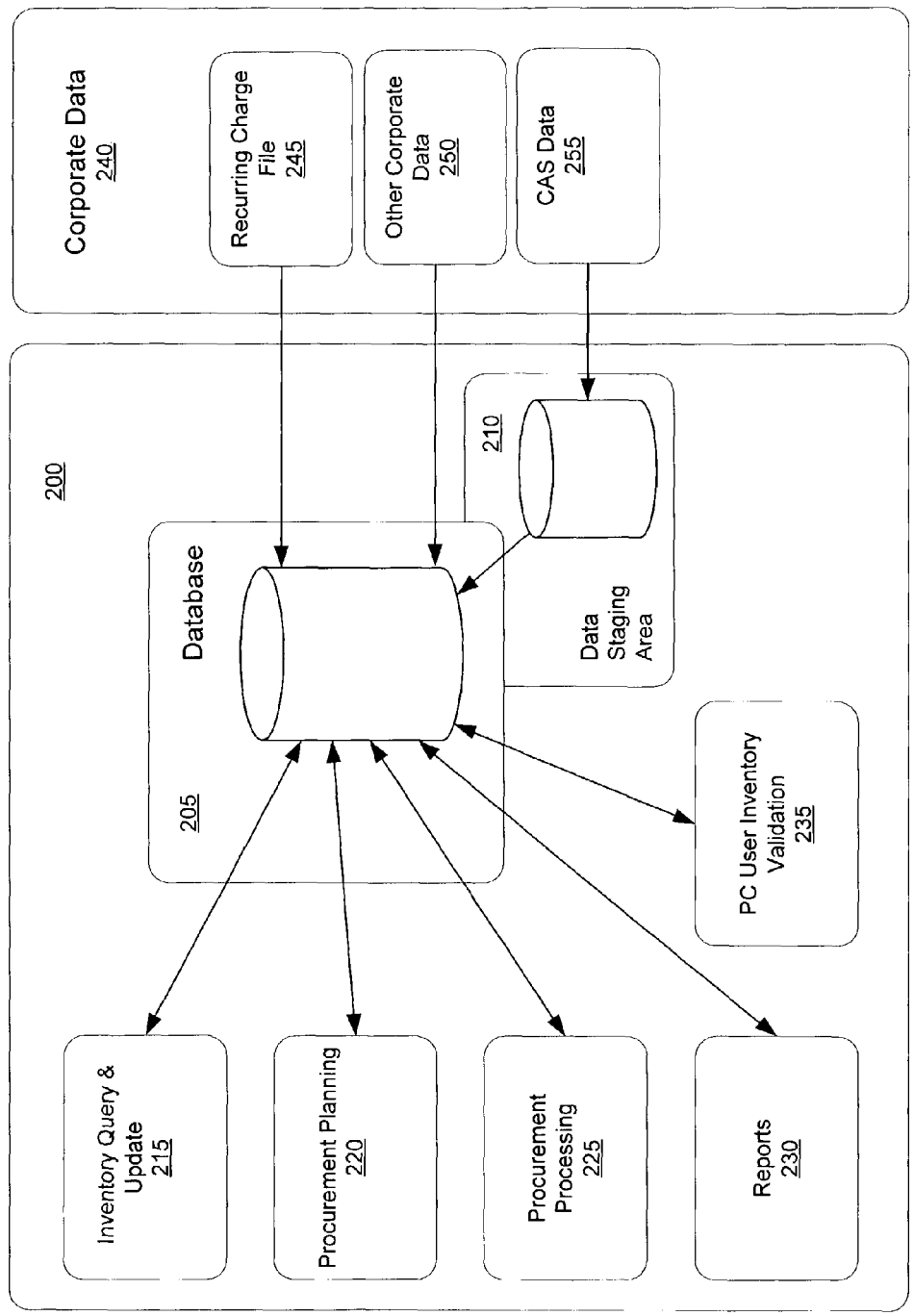
FIG. 2 shows a block diagram that illustrates the logical components of a computer-based tool.

As described above, a PCLCM program decentralizes some aspects of the responsibility for maintaining and tracking PC inventory so as to include the primary users of the PCs. That is, instead of a centralized asset management group having sole responsibility for tracking PC inventory, the group and the primary users share the responsibility for tracking PCs and assuring inventory accuracy. Other members of the organization, such as management and leadership, may have responsibility for other aspects of the PC lifecycle management (e.g., coordinating and planning PC procurements, replacements and returns). A computer-based, centralized tool is provided to support the various roles and responsibilities of the participants in the decentralized PCLCM program.

Generally, in the PCLCM program, individual PC users use the tool to report inventory data and lifecycle status of their PCs, and to periodically verify the accuracy of such data and status. The central support group may use the tool to ensure, for example, that user functions (such as reporting and verification) are performed, changes are reported to other corporate systems, processes are initiated to handle inventory changes triggered, for example, by employees leaving the company or an account, and for new order processing. Leaders and management may use the tool to generate standard and ad hoc management reports so as to be informed about what individuals have reported and to determine PC policies and guidelines. Individuals can also check reports and see what their management has provided as target measures, such as the ratio of PC(s) to people. Management also may use the tool to initiate procurement based on existing inventory records.

FIGS. 1A and 1B together illustrate a responsibility chart that illustrates one manner of dividing the roles and responsibilities in the PCLCM program. The chart shows that the participants in the PCLCM program include the individual users, management (organization coordinator), leadership, and a central support group.

An individual user is responsible for managing his or her personal PC inventory by maintaining this inventory using the PCLCM tool, knowing the location of each PC, and marking changes in PC status in the PCLCM tool. Thus, an individual user's specific responsibilities may generally include: tracking his/her PC(s); updating his/her PC record with any changes to the PC information; verifying his/her PC information periodically (e.g., every six months); packing and returning his/her PC at lease end; and updating a new PC record when a new PC is received. To allow an individual user to fulfill these responsibilities, the centralized tool may provide an individual user with the following functions: viewing his/her PC records; updating his/her PC records; identifying his/her respective manager; and validating new PC order records (e.g., by adding the correct new serial number to the record).

An organization coordinator is assigned for each organization in the PCLCM program. An organization coordinator communicates policies and information concerning the PCLCM program, the inventory and PCs to the users and other management of his or her organization. An organization coordinator assures compliance with inventory policies and procedures and coordinates PC replacement orders and lease end returns. An organization coordinator acts as the user contact for any PC problems and reports inventory and PC policy compliance to the organization management.

To fulfill his or her role, an organization coordinator's specific responsibilities may generally include: reviewing reverification status of PCs; determining and placing new PC orders; assisting users in resolving PC update or PC order problems; ensuring that PC records for new PCs are validated; and ensuring that PC records for users who leave the company are processed by working with leadership. To accomplish some of these responsibilities, the centralized tool may provide an organization coordinator with the following features and functions: pull ad hoc organization reports; research PC lifecycle status; make updates to PC records as appropriate; and procurement planning tools.

Leadership's role is to set policies for PCs and PC inventory on a per organization basis and overall. To fulfill this role, leadership's specific responsibilities may generally include: identifying the PC-per-person ratio targets for the organization(s); enforcing the PC-per-person ratio; approving exceptions to the inventory guidelines as appropriate; assigning management; providing budget to replace expiring, leased PCs; review PC verification reports; approve capital plan requests; and manage volume of total inventory. To help leadership set and enforce policies, the centralized tool provides an organization coordinator with the ability to pull ad hoc organization reports.

The central support group helps the individual users, organization coordinator, and leadership in managing and tracking PC inventory. To do so, the central support group's specific responsibilities may generally include: ensuring individual users are prompted when it is time to verify PC information and status; producing special exemption reports (i.e., reports showing PCs that were exempted from policies and guidelines and why) for leadership; ensuring that the PC-per-person ratios are within the target ratios set by leadership before new PCs are ordered; processing new PC orders; notifying leadership when a PC whose user has left the company remains unassigned; providing management with training on the processes and tool; coordinating and informing the management of current events and solutions to inventory problems; preparing/processing inventory write-offs and buy-outs; working with leadership to establish necessary inventory guidelines; and performing tool maintenance. To allow the central support group to accomplish some of these responsibilities, the centralized tool may provide the central support group with the following features and functions: research a PC's lifecycle status; make updates to PC records as appropriate; create special exemption reports; add corporate data to the tool; and process new PC orders.

As shown, members of the central support group are broken up into a number of roles that include the PCLCM leader, the PCLCM order coordinator, the PCLCM order processing group, the PCLCM financial leader, and the PCLCM asset management group.

The PCLCM leader manages the creation and implementation of PCLCM tools, processes and procedures. He or she reports PCLCM status to leadership and implements leadership's PC inventory policies and directives. The PCLCM leader also assures effective communication between users, coordinators, the PCLCM team and leadership.

The PCLCM order coordinator facilitates the PC replacement process. He or she works with the organization coordinator to assure PCs are replaced on an appropriate schedule. The order coordinator works with the order processing group to assure orders are placed and inventory is maintained and also works with the financial manager to expedite purchase approvals.

The PCLCM order processing group generates requisition orders in the corporate ordering system for replacement PCs and enters the new order information into the tool.

The PCLCM financial leader has financial responsibility for the PCs used in an organization.

The PCLCM asset management group synchronizes the data in the tool with corporate data sources. The asset management group assists users and coordinators in retirement and termination of PCs. The group tracks and communicates PC inventory problems to users, coordinators and leadership, and researches problems using the tool and corporate data sources.

FIG. 2 shows a block diagram that illustrates the logical components of one implementation of the computer-based tool 200 that supports the various roles and responsibilities of the participants in the PCLCM program along with complete lifecycle management of PCs in the program. In the implementation shown, the tool integrates processes and data for procurement and asset management, and provides a web-based interface to these processes and data. Using a web-based interface allows tool 200 to be accessible in real time and, depending on system specifics, may provide a practical global communication interface.

A PCLCM database 205 contains the information related to the PCs, such as, for example, assigned user, type of PC, serial number, order number, whether the PC is a fixed asset or leased, lease-end information and other contract information if the PC is leased, asset owner information if the PC is a fixed asset, depreciation, discontinuance order number, and the PC's current status (e.g., ordered or discontinued). In addition, the status history of each PC is tracked in the database. Some of the status history events tracked in the PC's lifecycle may include: PC ordered, PC received, assignment changed, PC lost or stolen, PC shipped to a service center for end of lease processing, PC received at the service center, discontinuance purchase order issued, and PC replaced. Also, database 205 contains other information that is helpful for running PC-related reports, such as, for example, the assigned user's organization and the total users in an organization.

One or more records are maintained for each PC and contain information related to the PC. In one implementation, each record for a PC has a status flag field that indicates the status of the PC or the information contained in the record. Using the status flag allows the current status of the PC to be maintained and status history to be tracked.

Figure 3:
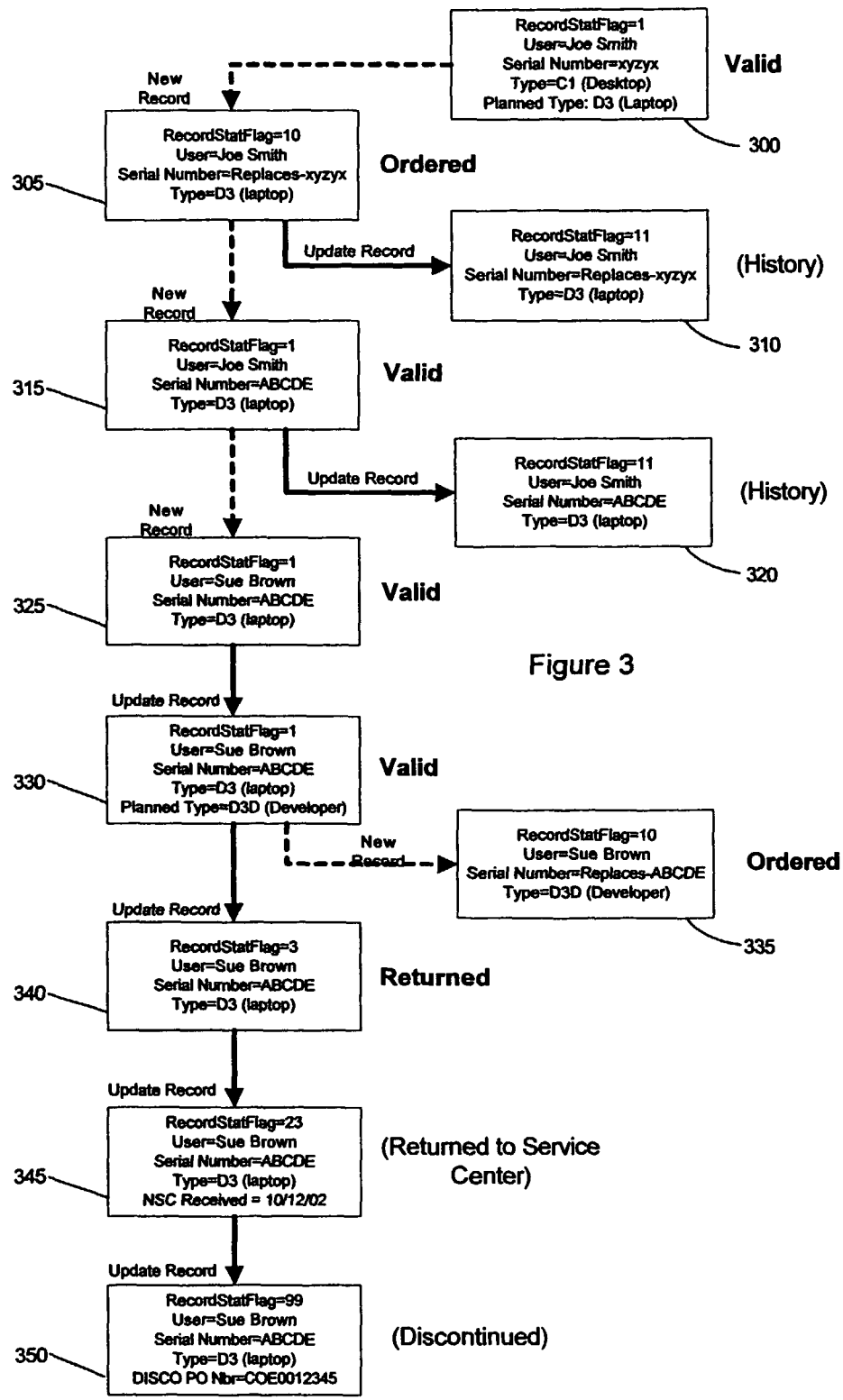
FIG. 3 illustrates an example of the evolution of the status information and records during the lifecycle of a PC.

FIG. 3 illustrates an example of the evolution of the status information and records for a PC during the lifecycle of the PC in one such implementation. The example shown tracks a PC from a planned order, through a reassignment, replacement and discontinuance of the PC's use (e.g., when the PC is returned at lease end). Each box represents a record with a few fields and values listed. The status flag field is shown as RecordStatFlag (referred to as status). The bold print to the right of each box is the status as displayed to the user. If this status is in parenthesis, the record is hidden from the user, but is accessible to the organization coordinators and leadership through the query and standard reports components (described below). Solid arrows in the diagram represent updated records and dotted arrows represent newly-created records.

A record 300 reflects that Joe Smith is assigned a desktop computer with serial number xyzyx. The status in record 300 is set to one, indicating that record 300 reflects a valid, current status of the PC and information. When Joe Smith uses tool 200 to view PCs assigned to him, a valid status will be displayed to him for this PC.

When a new PC is ordered to replace this desktop, a new record 305 is created with a status of 10 to indicate the record is for a newly-ordered PC. In the serial number field, record 305 reflects that the newly-ordered PC is to replace the PC with serial number xyzyx.

The serial number information of the old computer is retrieved from record 300 when record 305 is generated. When Joe Smith uses tool 200 to view the PCs assigned to him, an ordered status will be displayed to him for the new PC.

After Joe Smith receives the new PC, he notes that the serial number of the new PC is ABCDE. He uses tool 200 to view the PCs assigned to him and retrieves record 305. He validates the receipt of the new PC by entering its serial number. This causes record 305 to be updated by changing RecordStatFlag to status 11, which changes record 305 into a history record 310. That is, a status of 11 indicates that the information in the record is part of the status history of the PC.

At the same time, a new record 315 is generated that reflects Joe Smith is assigned a laptop computer with serial number ABCDE. The status is 1, indicating that record 315 reflects a valid, current status of the PC and information. When Joe Smith views the PCs assigned to him, a valid status will be displayed to him for this PC.

After some time, the PC is transferred to Sue Brown. She uses tool 200 to add the PC with serial number ABCDE to her list. This causes record 315 to be updated by changing the RecordStatFlag to status 11, which generates a history record 320.

At the same time, a new record 325 is generated that reflects Sue Brown is assigned the laptop computer with serial number ABCDE. The status is 1, indicating that record 325 reflects a valid, current status of the PC. When Sue Brown uses tool 200 to view the PCs assigned to her, a valid status will be displayed to her for this PC.

Near the end of the PC's lease, Sue's organization coordinator uses tool 200 to set the planned replacement type in the valid record 325 for Sue's laptop. This results in an update of record 325 (as reflected by record 330). The planned type field in record 330 reflects the replacement PC's type.

Once Sue's organization coordinator initiates an order for replacements, a new record 335 is generated. The new record 335 is created with a status 10 to indicate that the record reflects a newly-ordered PC. In the serial number field, record 335 also reflects that the newly-ordered PC is to replace the PC with serial number ABCDE.

When Sue receives her new PC, she transfers the data she needs from her old PC and packs up the old PC. She returns the old PC to the service center that handles PCs when their lease is up. When she returns her old PC, she uses the tool 200 to mark the old PC as returned. This updates record 330 (as reflected by 340) by changing its status to 3, which indicates that the PC has been returned. When Sue Brown uses tool 200 to view the PCs assigned to her, a returned status will now be displayed to her for this PC.

After the PC is received by the service center, record 340 is again updated (as reflected by record 345) by changing the status to 23 and adding the date the PC was received at the service center. When the PC is then returned to the lessor or retired, record 345 is updated (as reflected by record 350) by changing the status to 99 to indicate that the PC is discontinued.

Referring again to FIG. 2, some of the information stored in database 205 is loaded, verified, and/or updated in database 205 from external data sources, such as corporate data sources 240. For example, personnel data 255 from a corporate administration system can be maintained in a data staging area 210 and loaded into database 205 when needed. The personnel data 255 can be used to determine which users are still employed by the organization so as to insure the security of tool 200 and to adjust PC records based on personnel information (e.g., adjust based on name, address or department changes, or to mark a PC as no longer being assigned to an employee when the previously-assigned employee leaves the company). Recurring charge data 245 can be used to verify whether a PC is leased and to update the PC record appropriately (e.g., mark as leased and set lease-end date). Likewise, fixed asset data can be used to verify whether a PC is a fixed asset and update the PC record appropriately. Other corporate data 250 that may be used to load, verify, and/or update (either directly or through data staging area 210) data in database 205 includes data indicating that the PC was returned to a service center for lease-end processing, data indicating the people in an organization, data indicating results of an automatic network scan of PC inventory, along with data indicating PC serial number, type, assigned owner, order number, depreciation (if fixed asset), contract information, and new requisition orders.

An inventory query and update component 215 includes the processes and associated interfaces that allow management, leadership, or the central support group to query and update database 205. This allows them to generate ad-hoc reports based on PC-related information, research PC lifecycle status, make updates to PC records as appropriate, determine which users have not verified their PC data, manually load corporate data to database 205, create special exemption reports, and otherwise review or update PC-related information.

A procurement planning component 220 includes the processes and associated interfaces that enable a leader or coordinator to easily review the status of a group's PC portfolio, flag PCs to be replaced, and designate the model of the replacement PC.

A procurement processing component 225 includes the processes and interfaces that facilitate the creation of new records in database 205 for newly-ordered PCs. When a newly-ordered PC is replacing an old PC, the processes of component 225 merge data about the new replacement type and the PC being replaced to automatically generate a record for the newly-ordered PC. The new records are created in the procurement process and are then tracked through the entire PC lifecycle. Consequently, the newly-created record is used for procurement and asset management.

A standard report component 230 includes the processes and associated interfaces for the generation of standard reports. A user can select a standard report to be run, and the standard report is generated using preset queries to database 205.

A PC user validation component 235 provides the processes and interfaces that allow an individual PC user to view the records of assigned PCs, update these records, and validate the status of assigned PCs. The processes and interface may also allow a PC user to identify his/her respective organization coordinator.

Tool 200 also may have processes that support tracking of the sources of the data and the timing of loads or updates to provide audit capability. In addition, tool 200 may have processes that support the identification of conflicts between data from internal or external sources. The component features of tool 200 accessible to a particular user may depend upon his or her permission level. For example, an ordinary, individual PC user may only be able to access the PC validation component features, while a central support member may be able to access the procurement processing component features. Further, tool 200 also may have some additional functionality, such as the capability of generating billing reports or the capability to send automated reminders to users (e.g., nearing end of lease, time to prepare for a new PC, or time to verify PC information).

Figure 4:
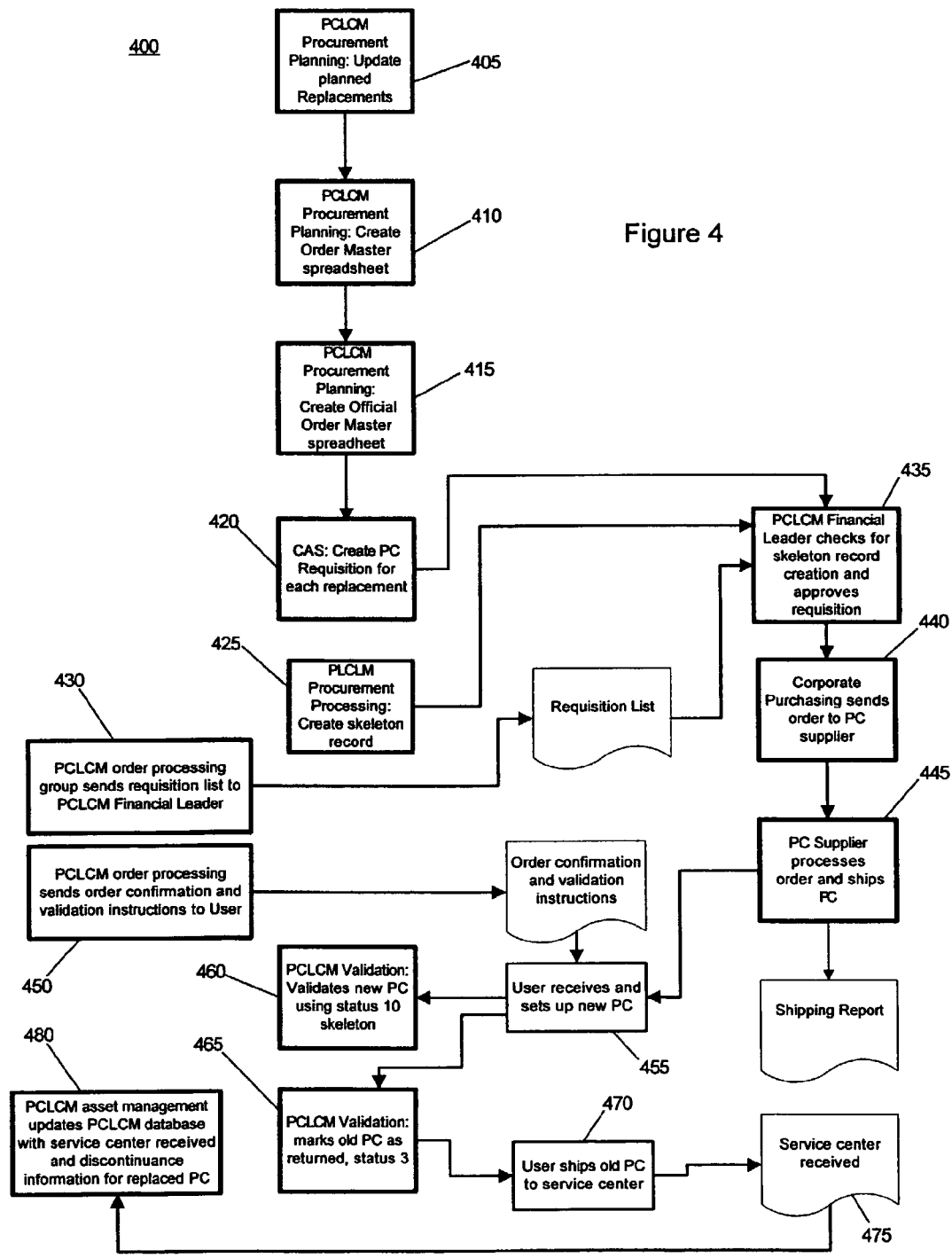
FIG. 4 is a flow chart for one implementation of a PC procurement and replacement process using the computer-based tool as illustrated in FIG. 2 and the roles and responsibilities described in FIGS. 1A and 1B.

FIG. 4 shows a flow chart for one implementation of the PC procurement and replacement process 400 using the computer-based tool as implemented in FIG. 2 with the roles and responsibilities described in FIGS. 1A and 1B. FIG. 4 will be discussed in conjunction with FIGS. 5A-7C, which illustrate screen-displays of exemplary user interfaces of tool 200 for various steps of process 400.

Initially, the organization coordinator sets the replacement types in database 205 for PCs that have expiring leases or any other PC that should be replaced (step 405). The organization coordinator sets the replacement types using the guidelines set by leadership. To set the replacement types, the organization coordinator uses a web browser to access the procurement planning features of tool 200. The various features of the tool may be accessed by using, for example, an initial tool menu interface.

FIGS. 5A-5E show an exemplary procurement planning interface 500. The initial screen of the interface 500 allows the organization coordinator to define query criteria for a group with which he or she wants to work. For example, the organization coordinator can separate out the group of PCs that have a lease end date within a certain period and that are assigned to people within the coordinator's organization. The organization coordinator can define a query using the query form 501, which the organization coordinator can reset by selecting button 503. The organization coordinator can also return to tool menu interface 400 by selecting button 504. Once the coordinator has defined a group, the coordinator submits the query by selecting button 502 to retrieve every valid status record in the group defined by the query criteria.

Figure 5A:
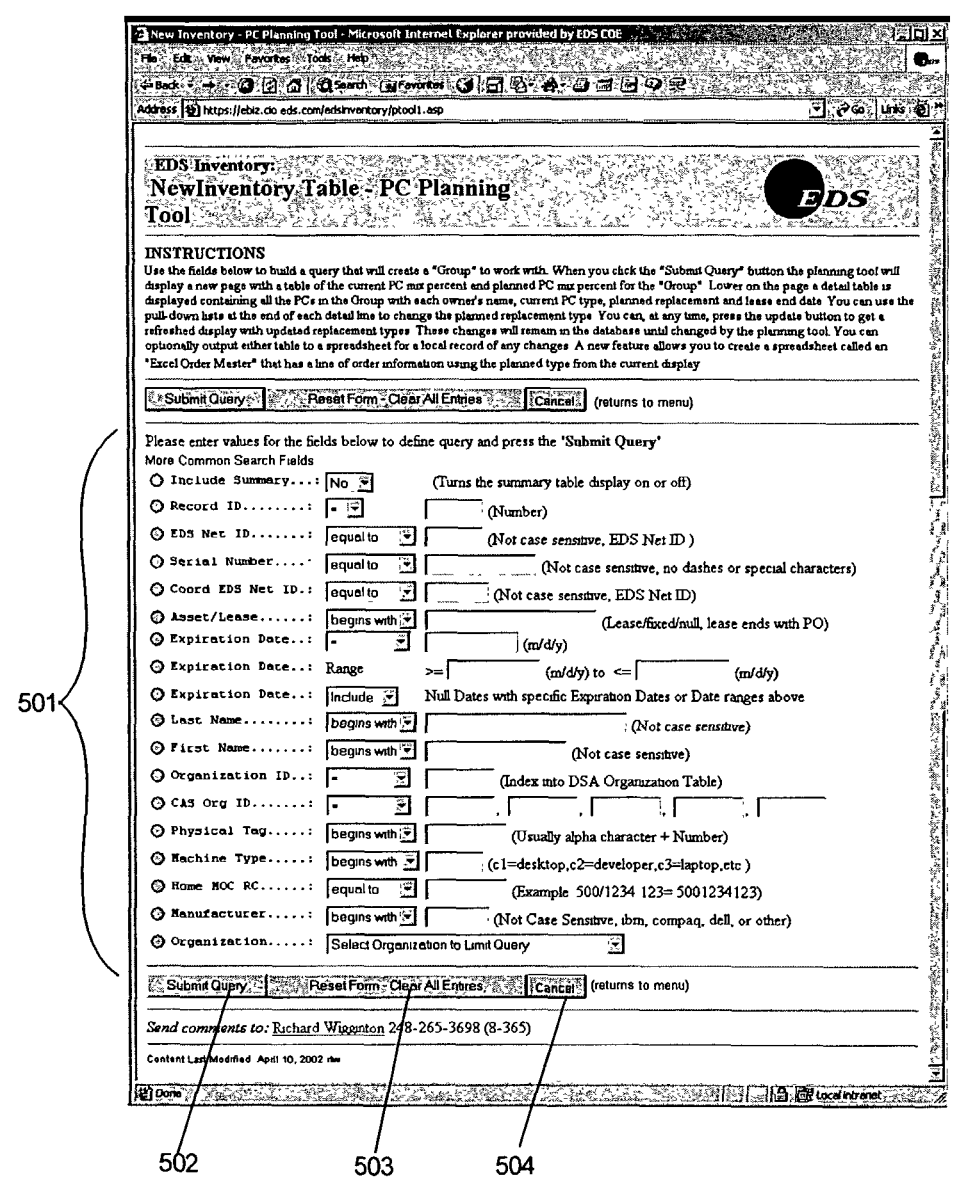
Figure 5B:
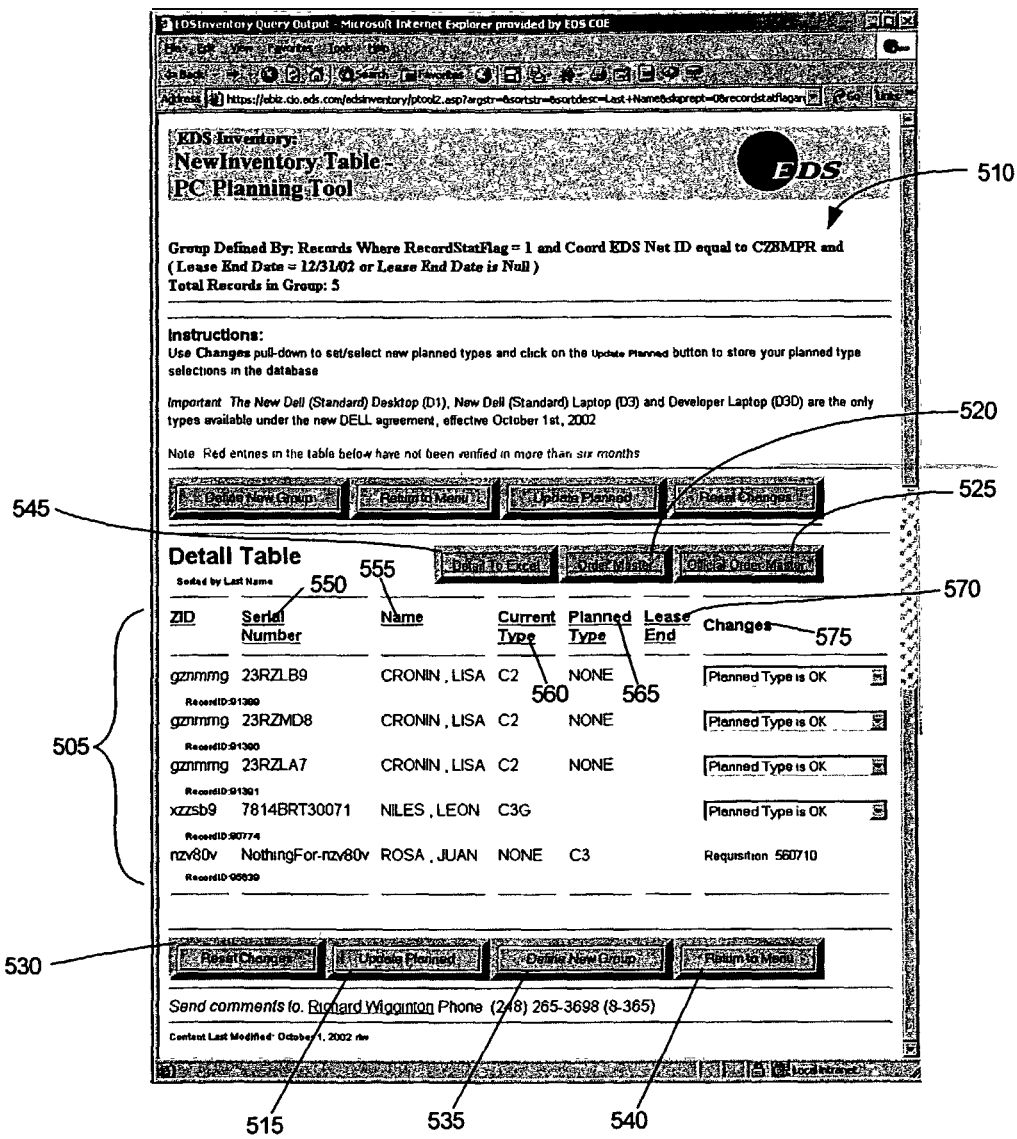

FIG. 5B shows a screen of the planning tool interface 500 that shows the retrieved records 505 for the queried group criteria 510. Each record has a column 550 showing the serial number of the PC, a column 555 showing the name of the assigned user, a column 560 showing the type of the PC, a column 565 showing the type planned for a replacement (if any), and a column 570 showing the lease end date (if any). Each record not reflecting a newly-ordered PC has a column 575 with a pull-down menu box to mark any changes that are to be made to the replacement type. If the record reflects a newly-ordered PC, column 575 contains the requisition order number of the newly-ordered PC.

In the group shown, there are three PCs listed that are not to be replaced (i.e. having a planned type of NONE (all for Lisa Cronin)). There is one user who does not have a planned replacement type (Leon Niles). One PC replacement has been ordered for a person (Juan Rosa) who had no assigned PC. The serial number of NothingFor-nzv80v shown in column 550 of that record means no assigned PC. The requisition number of the ordered PC is displayed in the column 575 of that record.

The organization coordinator can export this information to a spreadsheet by selecting button 545. The organization coordinator can also define a new group to work with by selecting button 535, reset any changes made to the replacement type (described below) by selecting button 530, and return to the tool menu interface by selecting button 540.

Figure 5C:
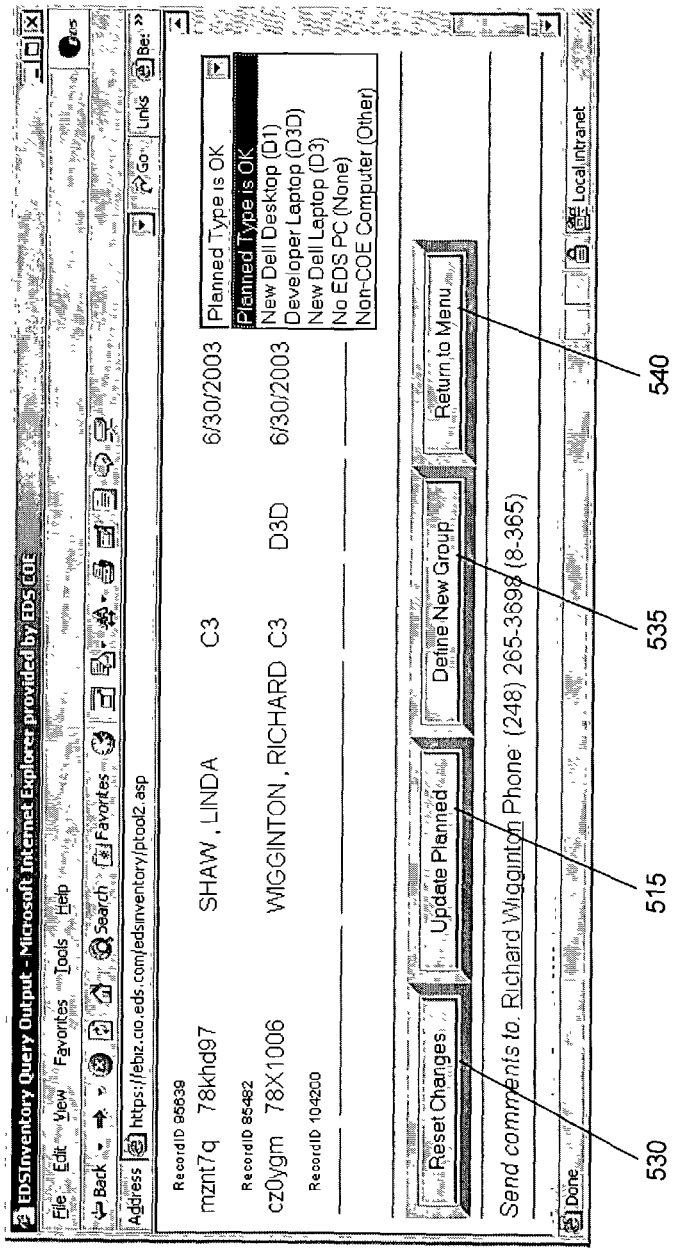
Figure 5D:
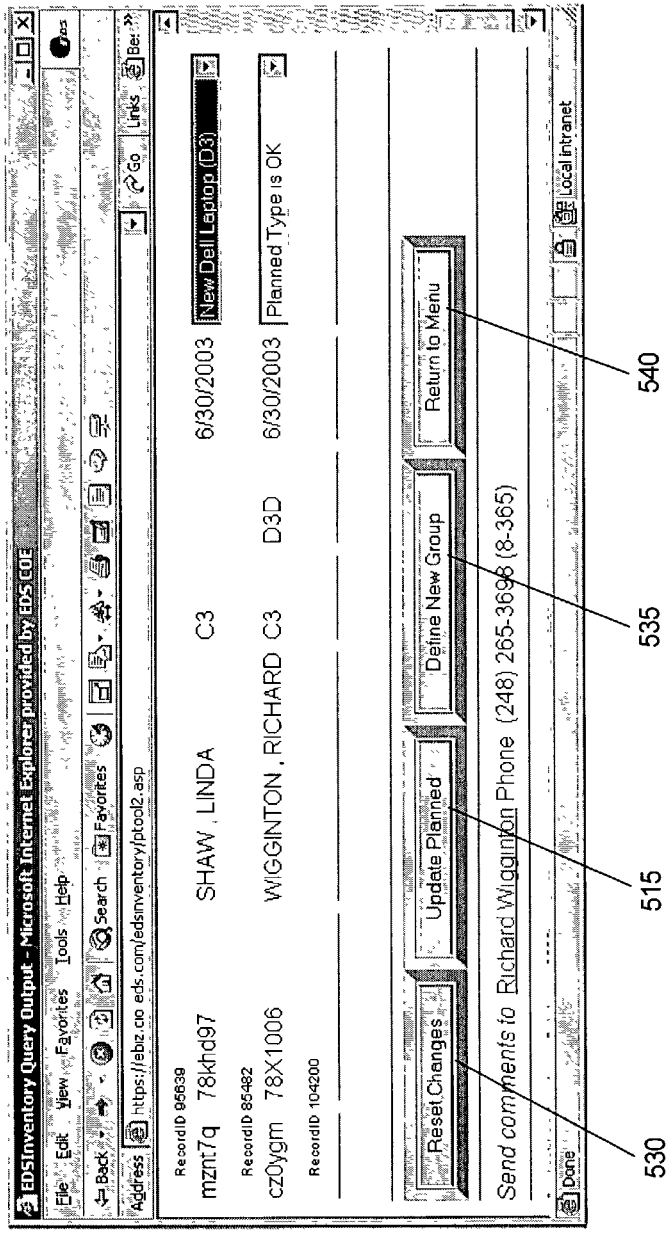
Figure 5E:
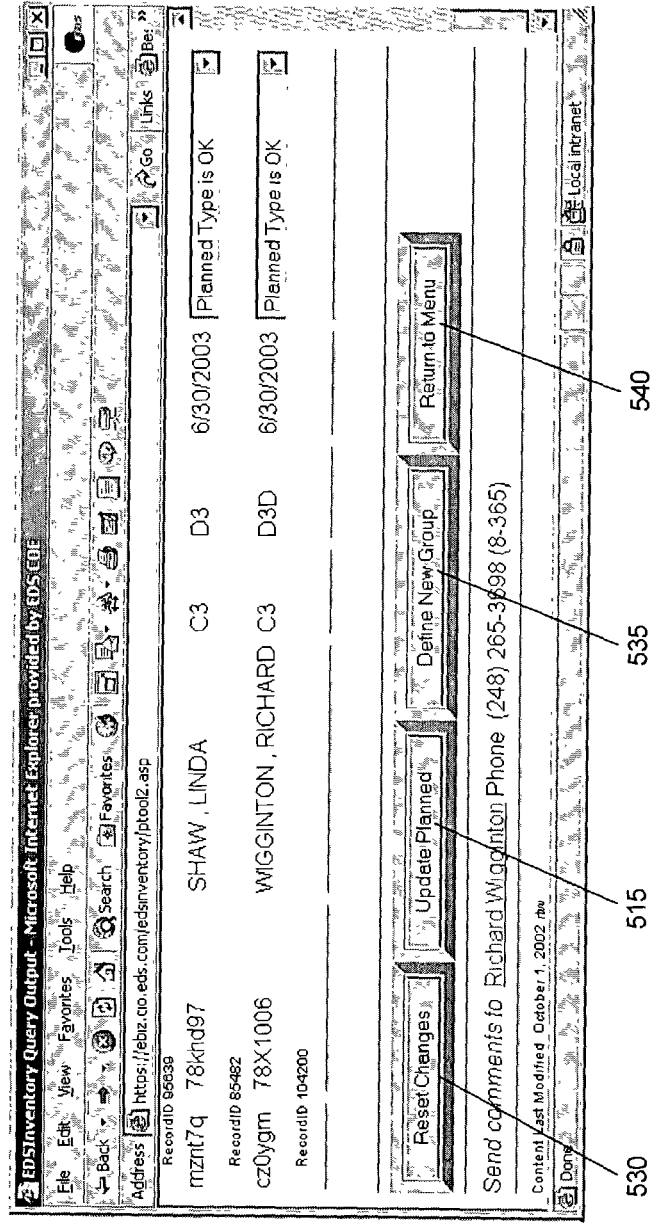

The pull-down menu boxes in column 575 have a default entry of "Planned type is OK." To change the planned replacement type, the organization coordinator uses the pull down menu box to view a selection of replacement PC types (as shown in FIG. 5C). Clicking on the appropriate type in the menu selects the new replacement PC type (as shown in FIG. 5D). Then the coordinator selects the update planned button 515 to update the planned type in database 205. After database 205 is updated, interface 500 reflects the new planned type in the planned type column (as shown in FIG. 5E). The planned type can be changed as often as necessary in any record that displays the pull-down list in column 575.

Referring again to FIG. 4, once the planned types for new orders are set, the organization coordinator can create an order master spreadsheet to check what will be ordered (step 410). The order master spreadsheet is generated by selecting the order master button 520. When the organization coordinator is satisfied that the order master is correct, the coordinator requests an official order master from the PCLCM order coordinator. The request outlines the group criteria used to generate the (unofficial) order master. The PCLCM order coordinator uses the planning tool to generate the official order master (step 415). The official order master is generated by entering the same group criteria from which the unofficial order master was created and selecting the official order master button 525. Generating the official order master locks the records of all PCs being replaced by the official order master. Once the official order master is generated, the planning tool interface 500 displays that there is an order started for the PCs.

The PCLCM order coordinator then sends the official order master to the requesting organization coordinator. The organization coordinator can modify the notify person, "ship to" address and contact phone on the official order master. When the organization coordinator is satisfied that the information on the official order master is correct, the organization coordinator returns the "approved" official order master to the PCLCM order coordinator.

The PCLCM order coordinator sends the official order master to the PCLCM order processing group. The PCLCM order processing group uses the information on the official order master to create a requisition order in a corporate ordering system for each replacement PC (step 420).

After a requisition order has been created, the PCLCM order processor uses the procurement processing component features of tool 200 to automatically create a skeleton record for each replacement PC (step 425). The skeleton record contains information about the PC being replaced and the PC that is replacing it, and indicates that the replacement PC has been ordered. The skeleton record is created by merging information from the old PC's record and information known about the replacement type. The needed information is extracted from database 205.

The skeleton record has a serial number for the replacement PC in the form "Replaces-<Serial number of the PC being replaced>" (the actual serial number is not yet known). The owner information and replacement PC type is obtained from the record for the PC being replaced. Information known about the replacement type is used to populate fields in the skeleton record about the new PC (e.g., the part number, description, CPU speed, disk size, memory, and monthly cost information).

Figure 6A:
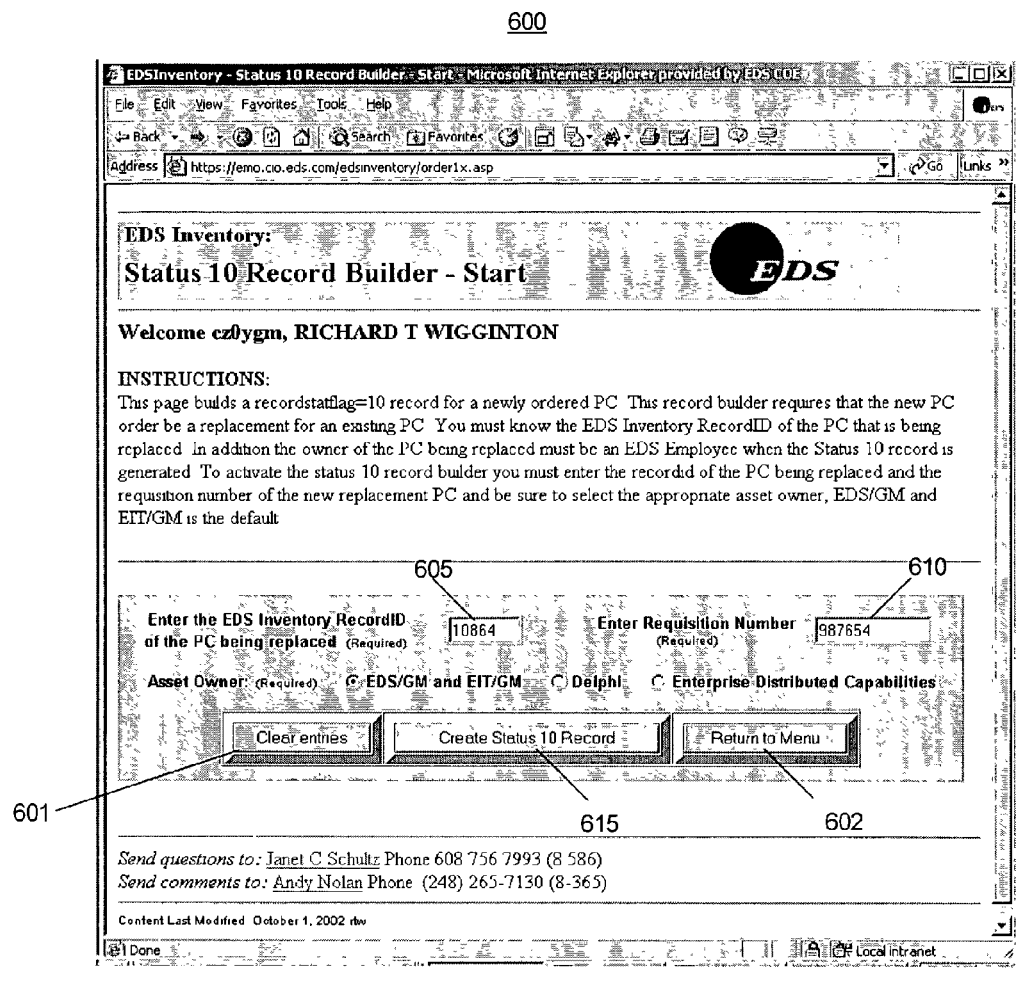
Figure 6C:
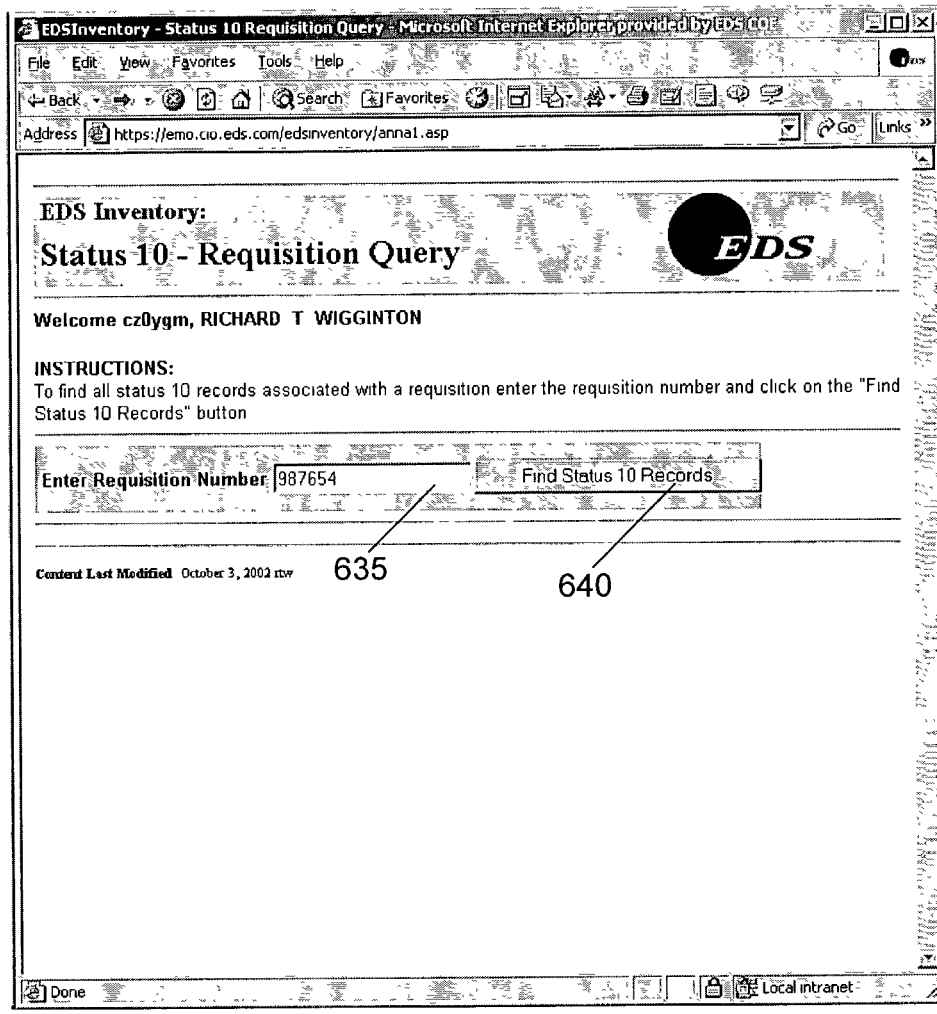

FIGS. 6A-6D show an exemplary interface 600 for building and confirming a skeleton record. The PCLCM order processor uses information on the official order master and the requisition number (resulting from the requisition order) to create the skeleton record. The initial screen of the interface requests the information needed to build the skeleton record, as shown in FIG. 6A. In the implementation shown, the record id of the PC to be replaced (that is, the id number of the record in the database for the PC to be replaced) is used with the requisition number. This information is input into text boxes 605 and 610. To create the skeleton record, the order processor selects the button 615. The order processor can also clear the entries in boxes 605 and 610 using button 601 or retrieve the tool menu interface using button 602.

Once the order processor selects button 615 to create the skeleton record, a confirmation screen is shown on interface 600 (shown in FIG. 6B). The confirmation screen shows who the new PC is for 630, information about the new PC 620, and information about the PC being replaced 625. As long as everything is correct, the order processor selects button 650 and the skeleton record is created in database 205. Alternatively, the order processor can restart the skeleton record creation process by selecting button 621 (which retrieves the screen shown in FIG. 6A) or retrieve the tool menu interface using button 622.

Figure 6D:
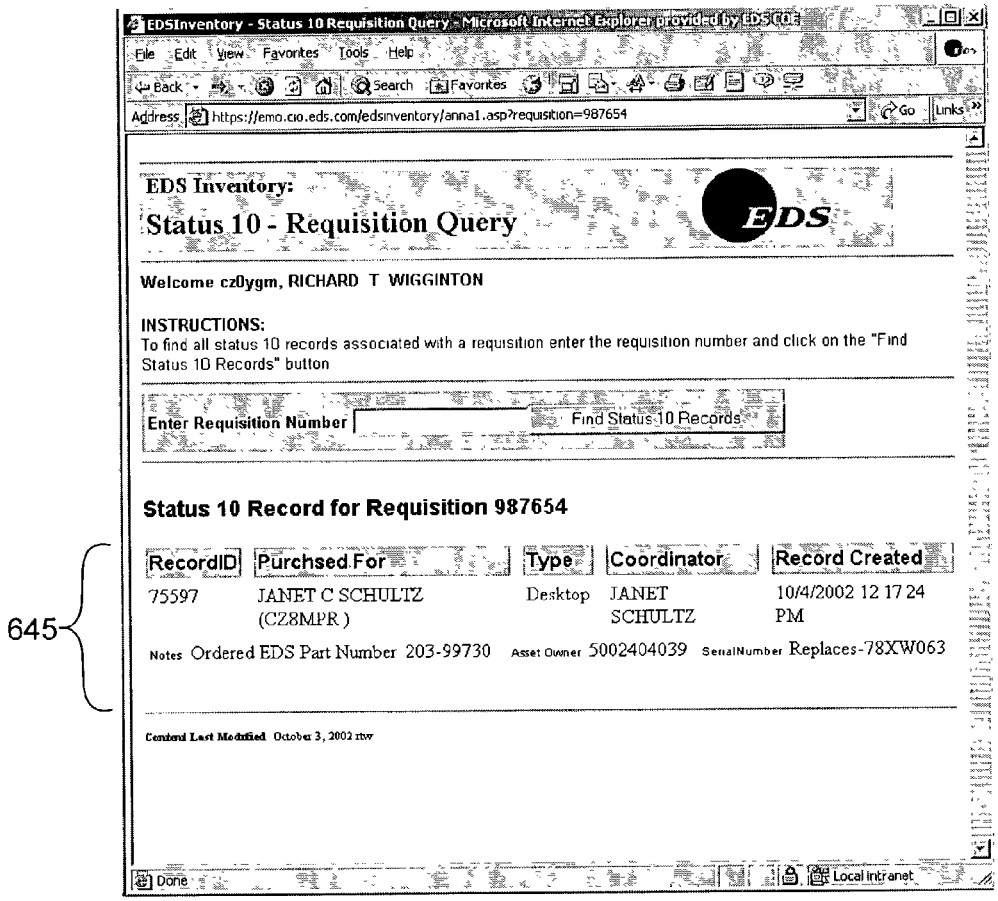

A screen, such as the one shown in FIG. 6C, is provided as part of interface 600 for confirming the creation of a skeleton record for a given requisition number. The desired requisition number is entered into text box 635. Selecting button 640 after entering the requisition number results in a screen showing information 645 about the skeleton record created for the requisition number, as shown in FIG. 6D. As shown, the information 645 may contain the record id for the skeleton record, for whom the PC was purchased, the PC type, the organization coordinator for the person for whom the PC was ordered, and when the skeleton record was created.

Once all requisitions and skeleton records have been completed, the order processor sends the list of requisitions to the PCLCM financial leader (step 430). The order processor informs the person for whom the new PC was ordered that the PC has been ordered (step 450). The order processor relays information to the person about the order and explains how to validate the new PC when it is received.

The PCLCM financial leader verifies that a skeleton record has been created for the ordered PC and, if so, uses the corporate ordering system to approve the requisition (step 435). To verify the creation of the skeleton record, the PCLCM financial leader uses the screen shown in FIG. 6D.

Corporate purchasing creates a purchase order with the PC vendor using the requisition information (step 440). The PC vendor assembles the PC requested on the purchase order and ships the PC to the "ship to" address on the purchase order that was copied into the requisition from the official order master (step 445). The PC is added to the shipping report that is eventually added to the shipments database. Information from the shipments database may be loaded into database 205.

When the PC arrives, the user (or organization coordinator) unpacks and sets up the PC (step 455). This usually consists of copying all of the user data from the old PC to the new PC. Once the PC is functional, the user uses the PC validation component features to validate the receipt of the PC and verify information about the PC (step 460).

Figure 7A:
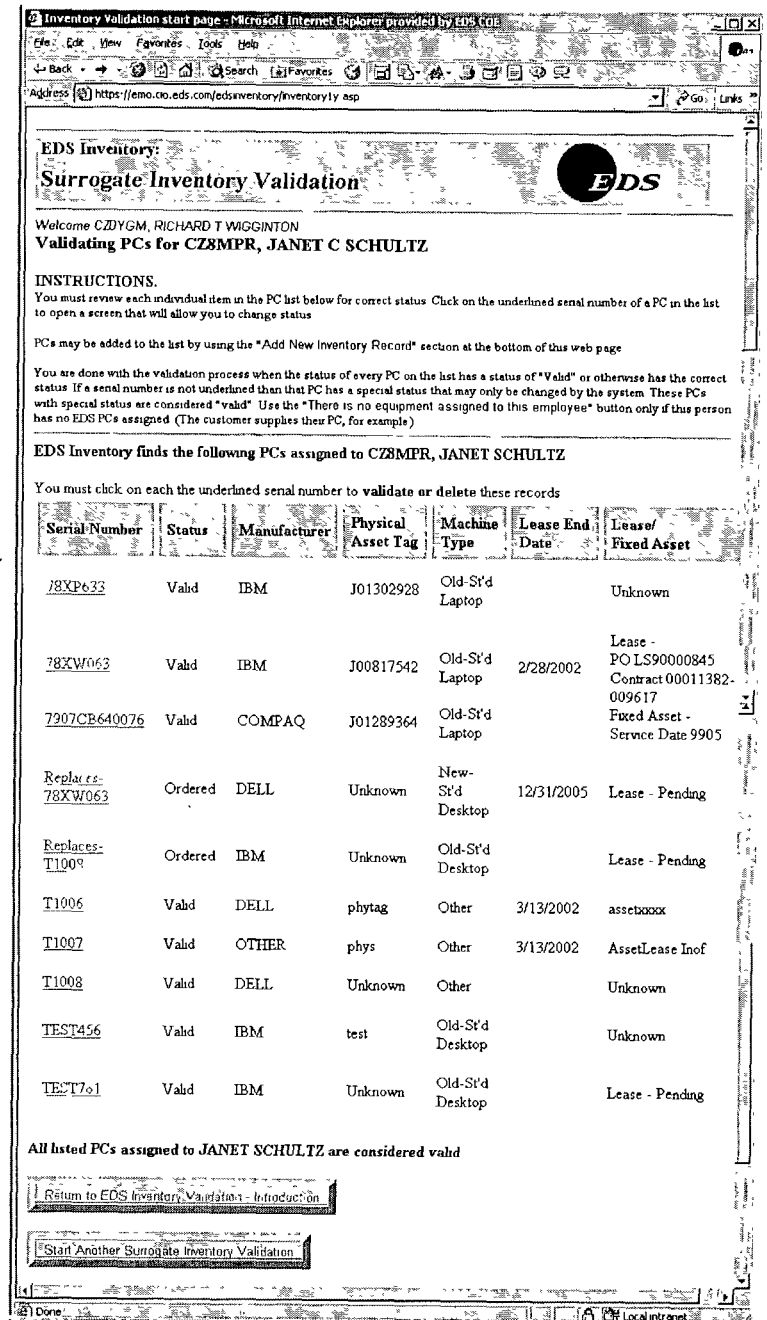
Figure 7B:
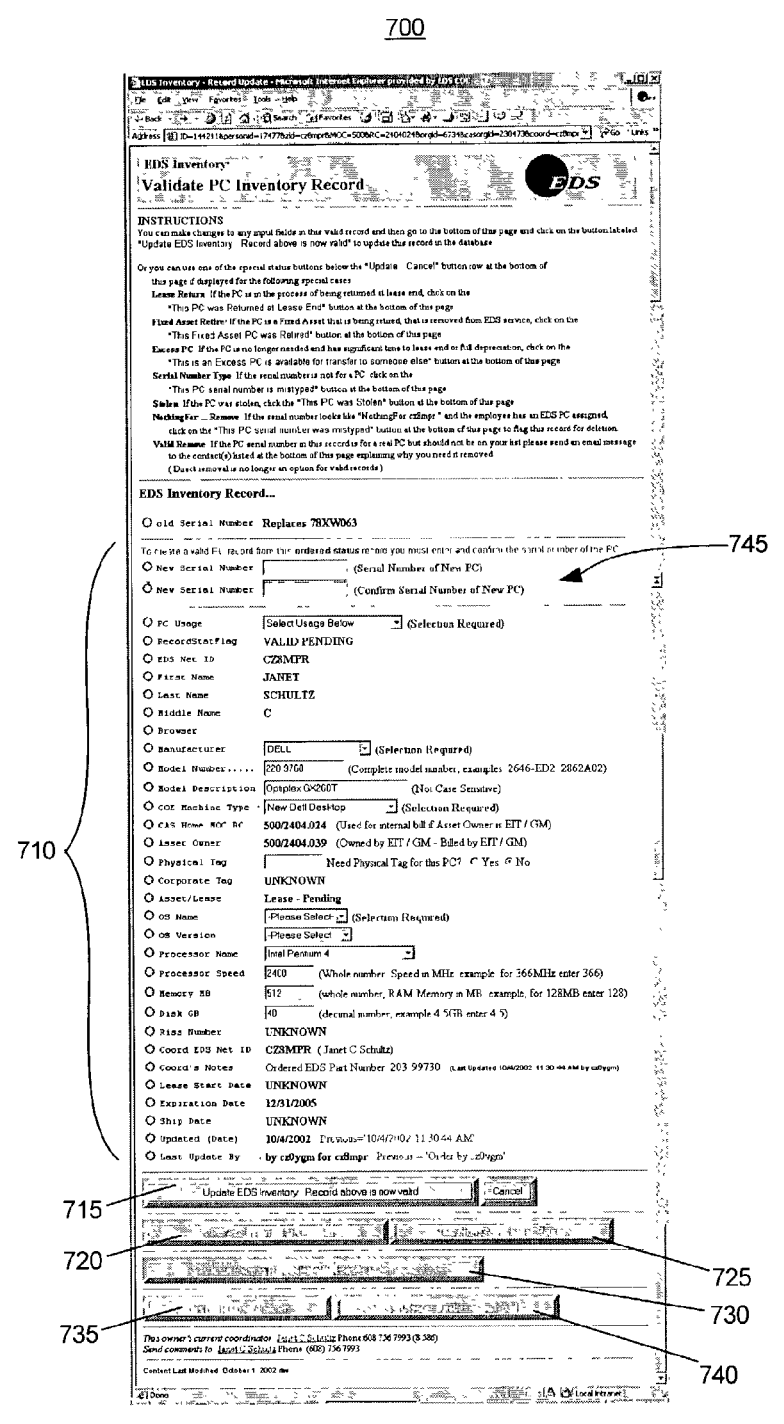

FIGS. 7A-7C illustrate an interface 700 for features of the PC validation component of the tool 200. The initial screen (shown in FIG. 7A) of interface 700 shows a list 705 of PCs assigned to a user. The list shows the serial number, the status of the PC, the manufacturer of the PC, the physical asset tag of the PC, the PC type, lease end date (if any), and information about whether the PC is leased or is a fixed asset. Two PCs have been order for this particular user to replace old PCs. They can be identified because their status is "ordered" and their serial numbers begin with "Replaces" followed by the serial number of the PC being replaced.

The user can view more detailed information regarding a particular one of the PCs listed by selecting the PC's serial number. This results in the display of a screen such as the one shown in FIG. 7B. This screen lists more detailed information 710 concerning the PC selected, and allows the user to update the PC information. To update the information, the user changes or adds the information to the fields in the list 710. Once the information has been added or changed, the user selects the update button 715, which results in the information being updated in database 205. The user can also mark the PC as being returned at the end of the lease by selecting button 720 or as being retired if the PC is a fixed asset by selecting button 725. Selecting button 730 will mark the PC as being excess and available for transfer to someone else. The user can also mark the PC as stolen by selecting button 735. If the serial number listed is incorrect for some reason, the user can fix the serial number by selecting button 740.

When the user receives the new PC, the user validates the receipt of a PC and verifies the PC's information using interface 700 by selecting the ordered PC from list 705 and updating PC's serial number to the actual serial number of the PC. In the screens shown, the user selected the ordered PC that replaces the PC with serial number 78XW063. As shown in FIG. 7B, the user can then enter the actual serial number of the PC (e.g., DELLX) in text box 745 and update the serial number by selecting button 715. If the information is consistent, the system will return the user to the PC list display with the ordered status record converted into a "valid" record with the correct serial number (shown in FIG. 7C).

The user (and/or coordinator) then packs up the old PC for return to a service center that handles PCs when their leases are up or they are otherwise going to be discontinued from use. The user uses the interface 700 to mark the old PC as being returned at the end of the lease or retired (step 465). The user then ships the old PC to the service center (step 470).

The service center receives and evaluates the PC for direct return, repair or buyout (if leased), or disposal. The serial number of the PC is added to the service center received report (step 475). The PCLCM asset management group uses tool 200 to mark the old PC as received at the service center when the PC serial number is posted on the service center received report (step 480). When a discontinuance record for the old PC is posted in the corporate system, the PCLCM asset management group uses tool 200 to mark the old PC as discontinued (step 480).

FIG. 8 shows a screen displaying an exemplary report that can be generated using query and update component 215 or included as a standard report of report component 230. The report provides a summary of PC and corresponding organization-related information for each organization. The report shows, for each organization, the number of employees, the number of validated PCs, and the ratio of validated PCs to employee. The report also shows the number of returned and excess PCs for each organization. The percentage mix of PC types is shown for each organization, along with the number of people without validated PCs. Lastly, the report shows the number of stolen or lost PCs and the number of PCs with unverified information.

Thus, the PCLCM program facilitates an organization or set of organizations in tracking their PC inventory by decentralizing the responsibilities regarding inventory tracking such that a central support group and the primary users share the responsibility for tracking PCs and assuring inventory accuracy. To support this decentralization, a computer-based tool is provided. The tool has a database of the PC inventory and a PC validation component that includes the processes and interfaces that allow an individual PC user to view and update the records of assigned PCs. Integrating a procurement planning component and a procurement processing component into the tool helps to streamline the procurement process and further supports lifecycle management of the PCs. Additionally integrating components for ad-hoc and standard querying and reporting helps leadership and management set and enforce policies regarding the PC inventory.

In general, the tool is not limited to any particular hardware or software configuration. Rather, it may be implemented using hardware, software, or a combination of both. The tool may be implemented as one or more computer programs that are executed on programmable computers comprising at least one processor and at least one data storage system. The programs may be implemented in a high-level programming language, a script language, or may also be implemented in assembly or other lower level languages, if desired.

Any such program will typically be stored on a computer-usable storage medium or device (e.g., CD-ROM, RAM, or magnetic disk). When read into the processor of the computer and executed, the instructions of the program cause the programmable computer to carry out the various operations described above.

Other implementations are within the scope of the following claims.

What is claimed is:

1. A computer-based tool for supporting a PC (personal computer) lifecycle management program for a PC inventory of personal computers, the tool comprising:
   a computer processor;
   a database of information related to the PC inventory, the database having one or more records containing information regarding each of the personal computers in the PC inventory, wherein each of the personal computers in the PC inventory is assigned for primary use by a corresponding one of a plurality of users; and
   a PC validation component executable on the computer processor and that includes processes and interfaces configured to permit the users to access the database, wherein each user in the plurality of users is permitted to view and update information in the database regarding the personal computer assigned to the corresponding user,
   wherein the PC validation component is configured to receive, from a particular one of the users, updated information regarding the personal computer assigned to the particular user.

2. The tool of claim 1 wherein the PC validation component is further configured to accept periodic verification messages from the users regarding the information in the database regarding the personal computers assigned to the respective users.

3. The tool of claim 1 wherein the information regarding the personal computer assigned to each of the users includes any one or more of type of personal computer, serial number, order number, whether the personal computer is a fixed asset or leased, and lease-end information.

4. The tool of claim 1 wherein the information regarding the personal computer assigned to each of the users includes lifecycle status history.

5. The tool of claim 1 wherein each of the one or more records has a status field that indicates the status of the corresponding personal computer or information in the record.

6. The tool of claim 1 wherein external data sources are used for loading information in the database related to the PC inventory.

7. The tool of claim 1 further comprising an inventory query and update component that includes processes and interfaces configured to accept querying and updating of the information related to the PC inventory contained in the database.

8. The tool of claim 1 further comprising a procurement planning component that includes processes and interfaces configured to provide flagging of personal computers in the PC inventory for replacement with new personal computers and designating a replacement personal computer type for the new personal computers.

9. The tool of claim 1 further comprising a procurement processing component that includes processes and interfaces configured to create new records in the database for newly ordered personal computers.

10. The tool of claim 1 further comprising a standard report component that includes processes and interfaces for generation of standard reports using preset queries of the database.

11. The tool of claim 1 further comprising:
- an inventory query and update component that includes processes and interfaces configured to accept querying and updating of the information related to the PC inventory contained in the database;
- a procurement planning component that includes processes and interfaces configured to provide flagging of personal computers in the PC inventory for replacement with new personal computers and designation of a replacement personal computer type for the new personal computers;
- a procurement processing component that includes the processes and interfaces configured to create new records in the database for newly ordered personal computers;
- a standard report component that includes the processes and interfaces for generation of standard reports using preset queries of the database.

12. The tool of claim 11 wherein:
the PC validation component is further configured to accept periodic verification messages from the users relating to the information in the database regarding the personal computer assigned to the respective user;
wherein the tool is configured to permit leaders, management or a central support group access to use the inventory query and update component to generate ad-hoc reports based on the information related to the PC inventory, make updates to the information related to the PC inventory, and determine whether each user has verified the information in the database regarding the personal computer assigned to the corresponding user;
wherein the tool is configured to permit the leaders or management to use the procurement planning component to flag the personal computer assigned to a given one of the users for replacement with a new personal computer and to designate a replacement personal computer type for the new personal computer;
wherein the tool is configured to permit the central support group to use the procurement processing component to generate a new record in the database for the new personal computer; and
wherein the tool is configured to permit the leaders and management to use the standard report component to generate standard reports based on the information related to the PC inventory.

13. The tool of claim 12 wherein the information regarding the personal computer assigned to each user includes any one or more of type of personal computer, serial number, order number, whether the personal computer is a fixed asset or leased, and lease-end information.

14. The tool of claim 13 wherein the information regarding the personal computer assigned to the each user includes lifecycle status history.

15. The tool of claim 11 wherein the tool is web-based.

16. The tool of claim 1 wherein the tool is web-based.

17. The tool of claim 1 wherein the PC validation component is configured to preclude access by a given one of the users to information regarding personal computers not assigned to the given user.

18. The tool of claim 1, further comprising at least one monitoring component for monitoring updates and verification messages made by the plurality of users to information in the database regarding personal computers assigned to the users, wherein access to the at least one monitoring component is permitted for leaders, management, or a central support group.

19. The tool of claim 1, wherein the updated information from the particular user validates receipt of a new personal computer by the particular user to replace a previously assigned personal computer.

20. The tool of claim 19, wherein the updated information includes a serial number of the new personal computer.

21. The tool of claim 1, wherein the updated information from the particular user indicates that the personal computer assigned to the particular user was transferred from another user.

* * * * *